(12) United States Patent
Sawazaki et al.

(10) Patent No.: US 11,905,196 B2
(45) Date of Patent: Feb. 20, 2024

(54) MOLD AND METHOD FOR MANUFACTURING QUARTZ GLASS CRUCIBLE

(71) Applicant: SHIN-ETSU QUARTZ PRODUCTS CO., LTD., Tokyo (JP)

(72) Inventors: Jiro Sawazaki, Echizen (JP); Yasuo Ohama, Echizen (JP); Katsumi Taniguchi, Echizen (JP)

(73) Assignee: SHIN-ETSU QUARTZ PRODUCTS CO., LTD., Tokyo (JP)

( * ) Notice: Subject to any disclaimer, the term of this patent is extended or adjusted under 35 U.S.C. 154(b) by 183 days.

(21) Appl. No.: 16/772,489

(22) PCT Filed: Dec. 4, 2018

(86) PCT No.: PCT/JP2018/044626
§ 371 (c)(1),
(2) Date: Jun. 12, 2020

(87) PCT Pub. No.: WO2019/116972
PCT Pub. Date: Jun. 20, 2019

(65) Prior Publication Data
US 2020/0399160 A1     Dec. 24, 2020

(30) Foreign Application Priority Data
Dec. 12, 2017  (JP) ................ 2017-238110

(51) Int. Cl.
*C03B 19/09*     (2006.01)
*C03B 20/00*     (2006.01)

(52) U.S. Cl.
CPC ............ *C03B 19/095* (2013.01); *C03B 20/00* (2013.01)

(58) Field of Classification Search
None
See application file for complete search history.

(56) References Cited

U.S. PATENT DOCUMENTS

| | | |
|---|---|---|
| 2010/0178374 A1 | 7/2010 | Yoshioka et al. |
| 2010/0243143 A1 | 9/2010 | Im et al. |
| 2016/0201216 A1 | 7/2016 | Sudo et al. |

FOREIGN PATENT DOCUMENTS

| | | |
|---|---|---|
| CN | 202449984 U | 9/2012 |
| CN | 102798290 A | 11/2012 |
| JP | S58-190892 A | 11/1983 |

(Continued)

OTHER PUBLICATIONS

JP 2012-17239 machine translation, Matsuo, Yayoi, Crucible Structure, Jan. 26, 2012 (Year: 2012).*

(Continued)

*Primary Examiner* — Queenie S Dehghan
(74) *Attorney, Agent, or Firm* — Oliff PLC

(57) ABSTRACT

A mold for manufacturing a quartz glass crucible by a rotary molding method, having a plurality of grooves that are concentric with respect to a mold rotation axis in at least a straight body portion of an inner surface of the mold, wherein the plurality of concentric grooves are non-penetrating grooves that do not penetrate the mold. This provides a mold for manufacturing a quartz glass crucible by a rotary molding method, having an inner surface made so that it is difficult for quartz powder to slide down when forming a quartz powder compact.

16 Claims, 4 Drawing Sheets

(56) References Cited

FOREIGN PATENT DOCUMENTS

| JP | 2001-191159 A | | 7/2001 |
|---|---|---|---|
| JP | 2004-026609 A | | 1/2004 |
| JP | 2005-298288 A | | 10/2005 |
| JP | 2008-273788 A | | 11/2008 |
| JP | 2012-017239 A | | 1/2012 |
| JP | 2012017239 A | * | 1/2012 |
| JP | 2012066969 A | * | 4/2012 |
| WO | 2011/101327 A1 | | 8/2011 |
| WO | 2015/001593 A1 | | 1/2015 |

OTHER PUBLICATIONS

JP 2012-066969 machine translation, Kenmochi et al., Method and Apparatus for Venting Gas Between Crucible and Susceptor, Apr. 5, 2012 (Year: 2012).*
DE 102010008162 machine translation, Lehmann et al. Process for the Production of Quartz Glass, Aug. 2011 (Year: 2011).*
WO 2014167788 machine transaltion, Yamagata, Silica vessel for pulling up single crystal silicon and process for producing the same, Oct. 2014 (Year: 2014).*
Mar. 5, 2019 International Search Report issued in International Patent Application No. PCT/JP2018/044626.
Jun. 16, 2020 International Preliminary Report on Patentability issued in Internaitonal Patent Application No. PCT/JP2018/044626.
Apr. 12, 2022 Office Action and Search Report issued in Chinese Patent Application No. 201880080270.4.
Aug. 14, 2023 Office Action issued in Korean Patent Application No. 2020-7016161.

* cited by examiner

[FIG. 1]
(a)
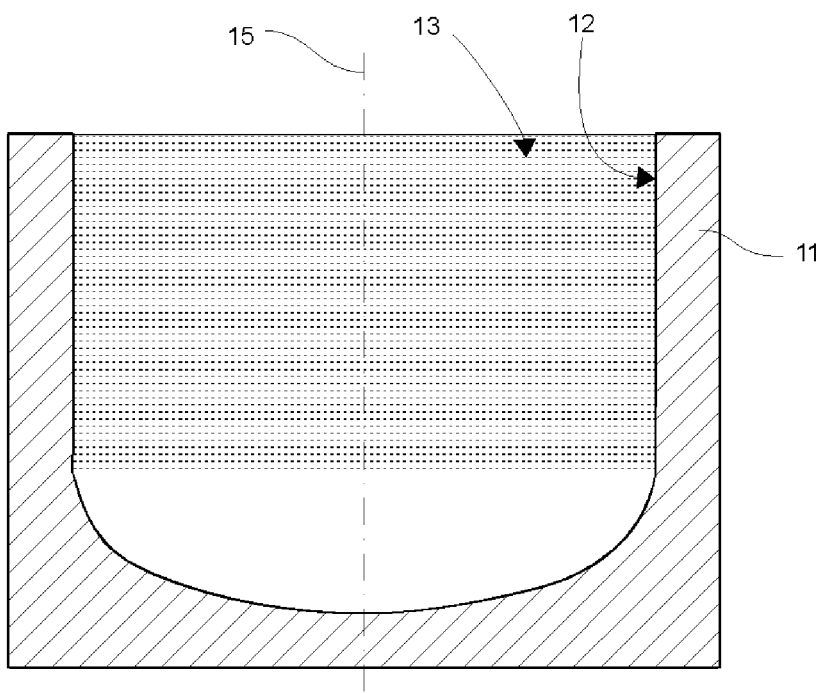
(b)
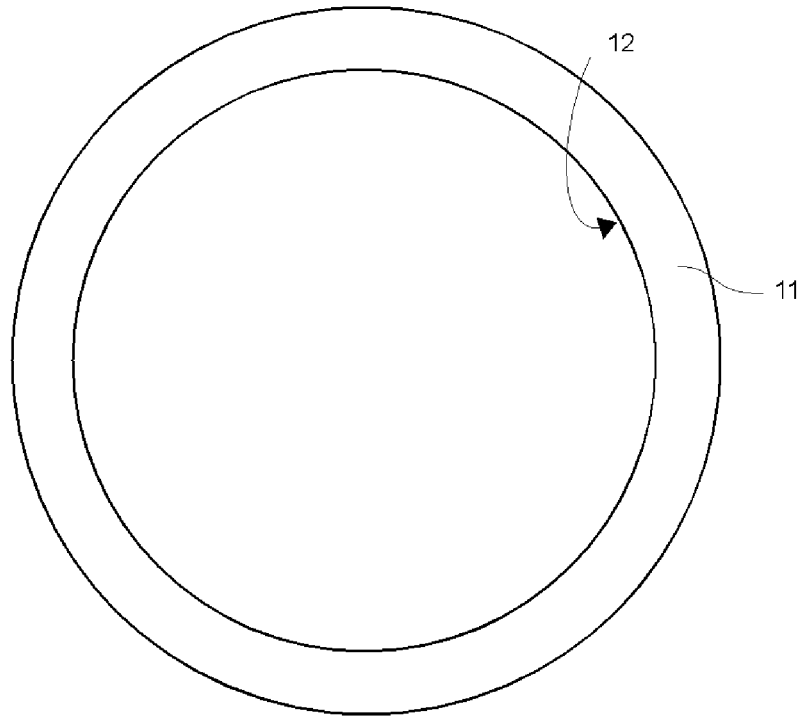

[FIG. 2]
(a)
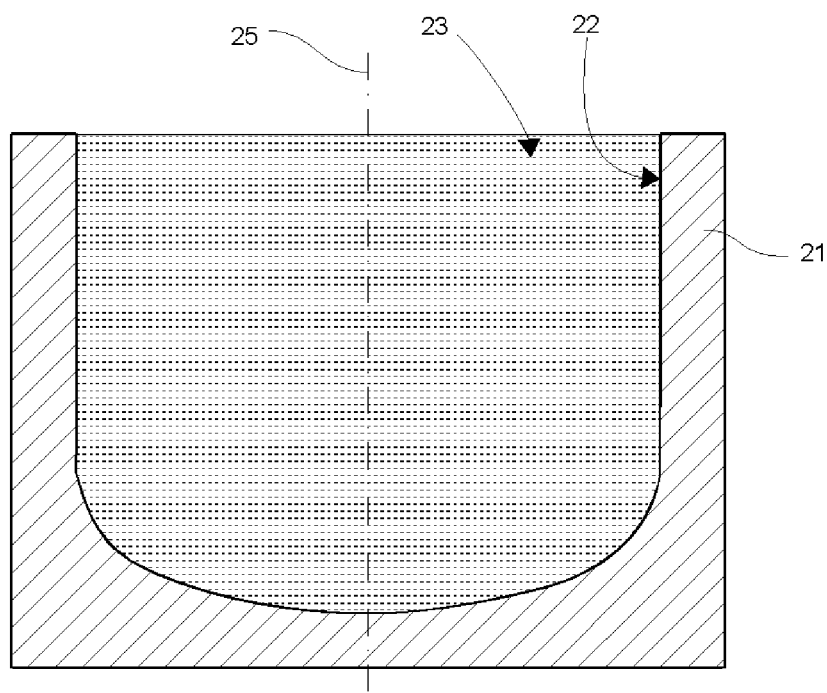
(b)
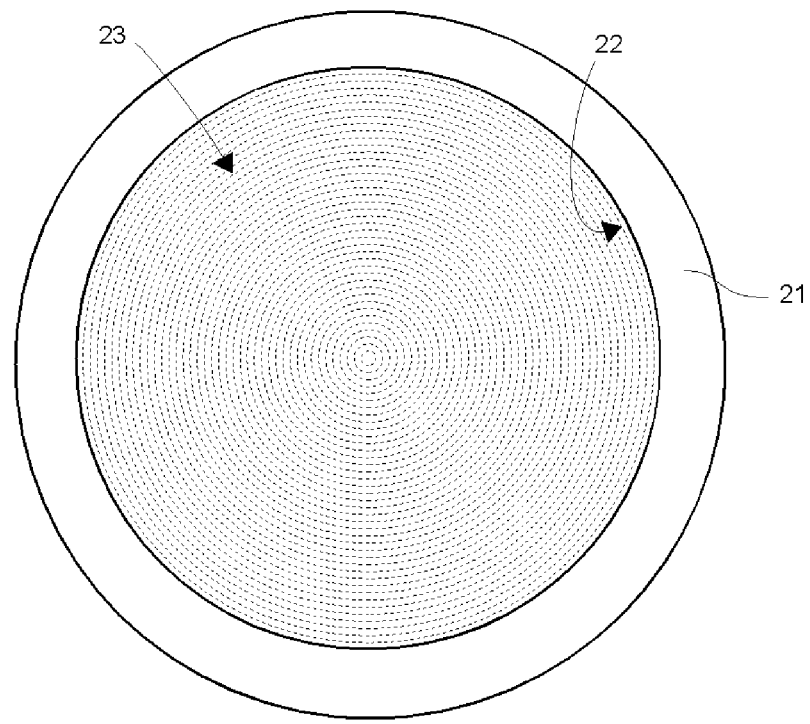

[FIG. 3]
(a)
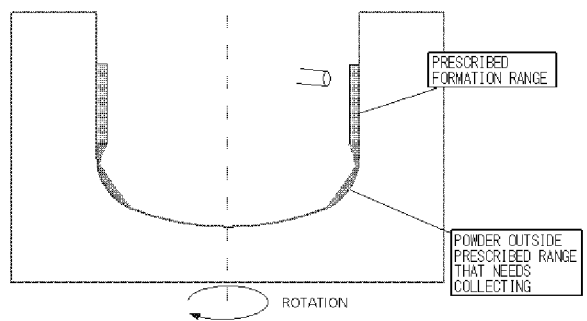
(c)
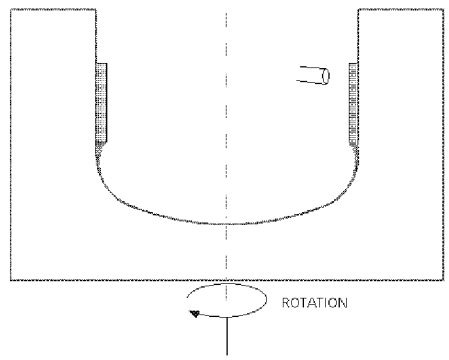
(b)
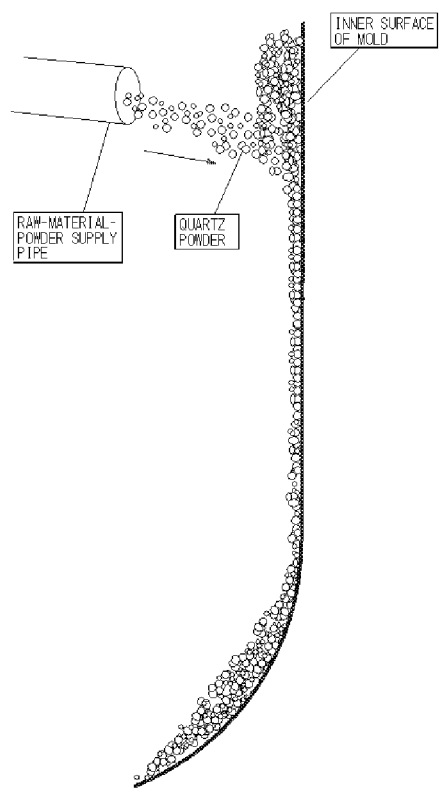
(d)
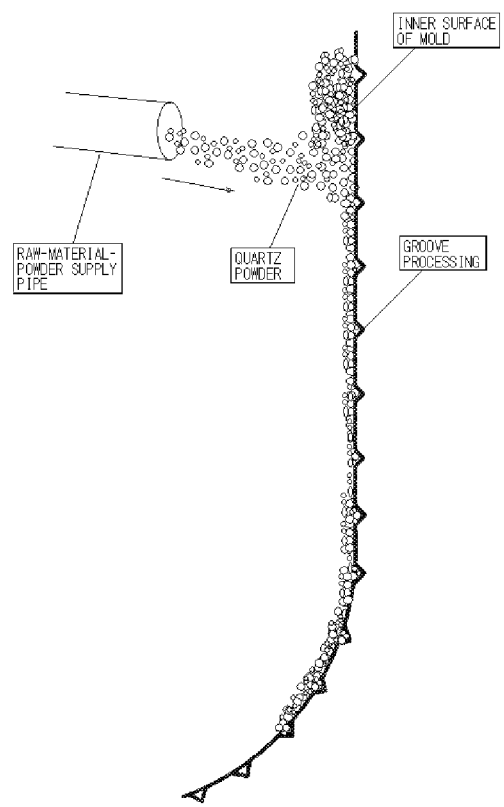

[FIG. 4]
(a)
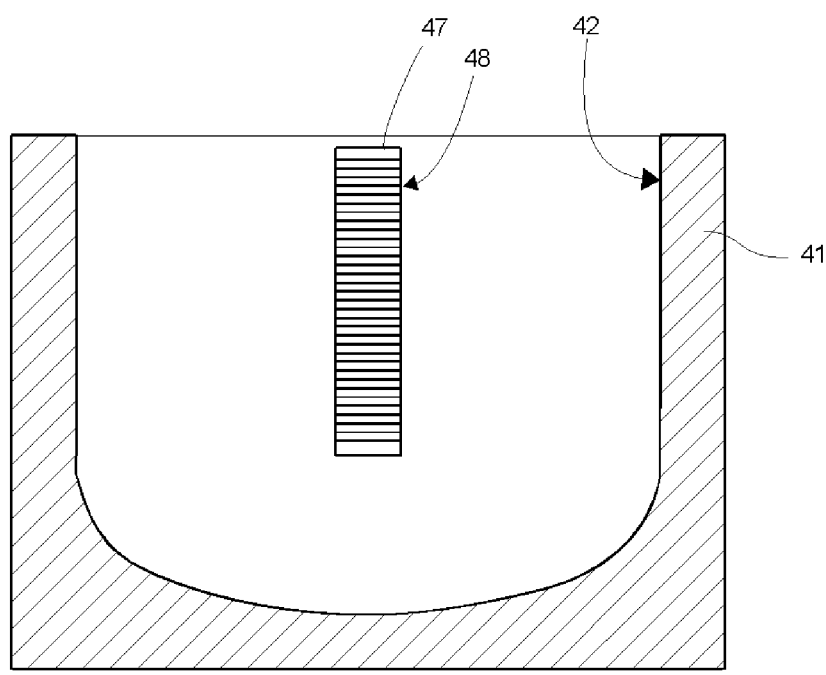
(b)
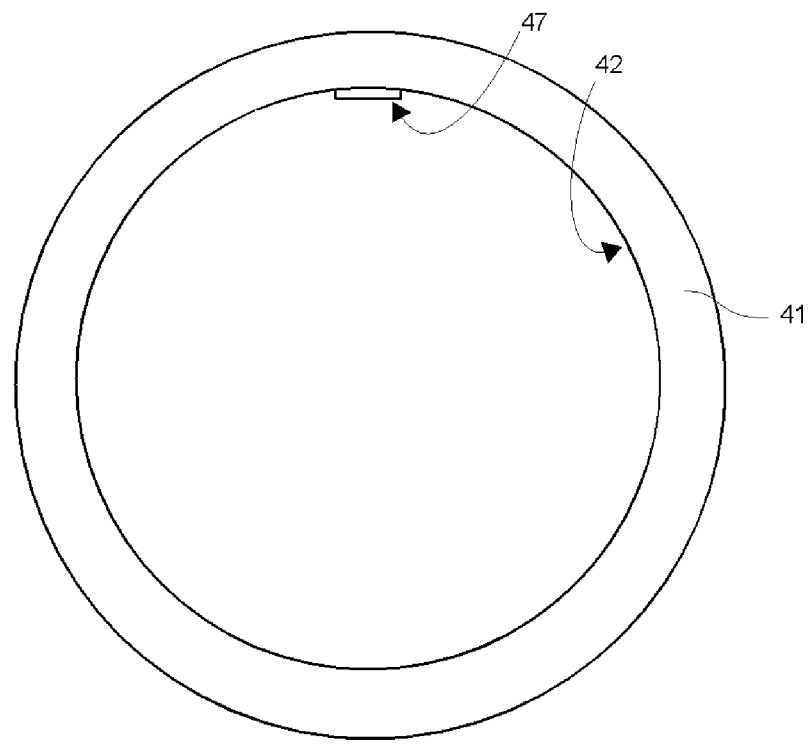

MOLD AND METHOD FOR MANUFACTURING QUARTZ GLASS CRUCIBLE

TECHNICAL FIELD

The present invention relates to a mold for manufacturing a quartz glass crucible, and relates to a method for manufacturing a quartz glass crucible using the mold.

BACKGROUND ART

A rotary molding method is known as a method for manufacturing a quartz glass crucible for silicon single crystal pulling. This method is a method of heat-melting quartz powder deposited along an inner surface of a rotating mold for vitrification and forming into a shape of a crucible (for example, Patent Document 1).

In the rotary molding method, the quartz powder is formed in a prescribed shape before melting the quartz glass crucible, and the formation operation is performed by blowing quartz powder onto the inner surface of a straight body portion of the mold rotating at a high rate to deposit the quartz powder on the straight body portion by centrifugal force.

In an early stage of the formation of a quartz powder compact, the blown quartz powder slides on the inner surface of the mold, falls into a small curved portion (which indicates a curved portion directly below the straight body portion; the portion between a curved portion at the bottom (a large curved portion) and the straight body portion) of the mold, and is deposited. Quartz powder accumulates on the deposited quartz powder, and once quartz powder is stuck on the inner surface of the straight body portion of the mold, it then becomes difficult for blown quartz powder to slide down, and it becomes possible to stick quartz powder on a target position.

CITATION LIST

Patent Literature

Patent Document 1: Japanese Unexamined Patent Application Publication No. 2004-026609

SUMMARY OF INVENTION

Technical Problem

For example, in the case of a crucible having a raw material quartz powder of a different kind to that of a base layer formed on an outer layer of the straight body portion only within a prescribed range, it is necessary to collect the quartz powder deposited in a small curved portion (a curved portion directly below the straight body portion) or on the straight body portion outside the prescribed range.

Since all the collected quartz powder is discarded, there has been a problem that the more the quartz powder that sticks outside the prescribed range, the more the amount of quartz powder used necessary for the formation within the prescribed range increases, increasing manufacturing cost. In addition, there has been a problem that the more the quartz powder outside the prescribed range, the more time it takes to collect the quartz powder, which leads to degradation of productivity.

The present invention has been made in view of the above-described situation, and an object thereof is to provide a mold for manufacturing a quartz glass crucible by a rotary molding method, having an inner surface made so that it is difficult for quartz powder to slide down when forming a quartz powder compact.

Solution to Problem

The present invention has been made to solve the above-described problem, and provides a mold for manufacturing a quartz glass crucible by a rotary molding method, including a plurality of grooves that are concentric with respect to a mold rotation axis in at least a straight body portion of an inner surface of the mold, wherein the plurality of concentric grooves are non-penetrating grooves that do not penetrate the mold.

With the inventive mold, the inner surface of the mold has a shape on which quartz powder gets caught by the presence of the grooves. Moreover, in this manner, quartz powder gets caught on the grooves on the inner surface of the mold, improving adhesion of the quartz powder. Therefore, since the sliding down of quartz powder on the inner surface of the mold can be suppressed, it becomes possible to stick the quartz powder efficiently on a target position, and the amount of raw material powder used can be reduced. Furthermore, the operation time for collecting the quartz powder that falls outside the prescribed range is shortened, improving productivity.

In this event, the plurality of concentric grooves preferably have a width of 0.3 mm or more and 2.5 mm or less, a depth of 0.2 mm or more and 4 mm or less, and a pitch of 3 mm or more and 20 mm or less.

Quartz powder can be made to get caught on the grooves on the inner surface of the mold more favorably by forming such grooves on the inner surface of the mold, and adhesion of the quartz powder can be further improved. As a result, the sliding down of the quartz powder on the inner surface of the mold can be suppressed more effectively.

Moreover, a material of the mold is preferably stainless steel or carbon.

By using such a material for the mold, the mold can be made more suitable for manufacturing a quartz glass crucible.

Moreover, the plurality of concentric grooves are preferably formed across a whole of the inner surface of the straight body portion of the mold.

By thus forming grooves on the whole of the inner surface of the straight body portion of the mold, the sliding down of the quartz powder on the inner surface of the mold can be suppressed more appropriately.

Moreover, the plurality of concentric grooves can be formed across a whole of the inner surface of the mold.

The effects of the present invention can also be obtained by thus forming the grooves across the whole of the inner surface of the mold.

Furthermore, the present invention provides a method for manufacturing a quartz glass crucible, including the steps of: while rotating any mold described above, blowing quartz powder onto the inner surface of the rotating mold to form a quartz powder compact having a prescribed shape formed of quartz powder, and melting the formed quartz powder compact to fabricate a quartz glass crucible, wherein when the quartz powder is blown onto the inner surface of the rotating mold, the quartz powder is blown at the inner surface including a portion where the plurality of concentric grooves are present.

With the inventive mold, since the sliding down of quartz powder on the inner surface of the mold can be suppressed as described above, a method for manufacturing a quartz glass crucible using such a mold makes it possible to stick quartz powder on a target position efficiently, and the amount of raw material powder used can be reduced. Furthermore, the operation time for collecting the quartz powder that falls outside the prescribed range is shortened, and productivity can be improved.

Advantageous Effects of Invention

With the inventive mold, the inner surface of the mold has a shape on which quartz powder gets caught by the presence of grooves. Moreover, in this manner, quartz powder gets caught on the grooves on the inner surface of the mold, improving adhesion of the quartz powder. Since the sliding down of quartz powder on the inner surface of the mold can be suppressed, it becomes possible to stick the quartz powder efficiently on a target position, and the amount of raw material powder used can be reduced. Furthermore, the operation time for collecting the quartz powder that falls outside the prescribed range is shortened, improving productivity.

BRIEF DESCRIPTION OF DRAWINGS

FIG. 1 is a diagram showing an example of the mold according to the present invention, where (a) is a schematic cross-sectional view and (b) is a schematic top view.

FIG. 2 is a diagram showing a different example of the mold according to the present invention, where (a) is a schematic cross-sectional view and (b) is a schematic top view.

FIG. 3 is a schematic diagram explaining the function of the mold according to the present invention in comparison to a conventional mold.

FIG. 4 is a diagram schematically showing a mold having a groove-processed stainless steel plate mounted used in an Experimental Example, where (a) is a schematic cross-sectional view and (b) is a schematic top view.

DESCRIPTION OF EMBODIMENTS

Hereinafter, the present invention will be described more specifically with reference to the drawings.

FIG. 1 shows a diagram of an example of the mold according to the present invention. FIG. 1 (a) is a schematic cross-sectional view of the mold, and FIG. 1 (b) is a top view of the mold. A mold 11 is a mold for manufacturing a quartz glass crucible by a rotary molding method. Moreover, the mold 11 has a plurality of grooves 13 that are concentric with respect to a mold rotation axis 15 in at least a straight body portion of an inner surface 12 of the mold 11. In the inventive mold 11, the plurality of concentric grooves 13 need to be grooves that do not penetrate the mold 11 (non-penetrating grooves).

The plurality of concentric grooves 13 preferably have a groove width of 0.3 mm or more and 2.5 mm or less. Furthermore, the plurality of concentric grooves 13 preferably have a depth of 0.2 mm or more and 4 mm or less. Furthermore, the plurality of concentric grooves 13 preferably have a pitch of 3 mm or more and 20 mm or less. Quartz powder can be made to get caught on the grooves on the inner surface of the mold more favorably with such grooves, and adhesion of the quartz powder can be further improved. Furthermore, a lower limit of the width of each groove is more preferably 0.5 mm or more, and an upper limit is more preferably 2.0 mm or less.

The depth of each groove is preferably 0.2 mm or more as described above, more preferably 0.3 mm or more. Quartz powder can be made to get caught on the grooves on the inner surface of the mold more favorably by setting the depth of the plurality of concentric grooves 13 to 4 mm or less. The depth of the plurality of concentric grooves 13 is more preferably 1.5 mm or less. With the groove depth of 4 mm or less, when a quartz glass crucible is manufactured using the mold, a shape of an outer surface of the crucible can be within a range that causes no problems in using as a crucible. Note that the range of the groove depth can be determined depending on conditions such as a material of the mold. For example, when the material of the mold is stainless steel, 2.5 mm can be an upper limit of the groove depth. This is because manufacturing cost rises when a thickness of the mold becomes thick in the case of a stainless steel mold. Therefore, with a stainless steel mold, when the original thickness of the mold is 6 mm, the depth is preferably a depth of up to 2.5 mm. Furthermore, for example, when the material of the mold is carbon, the thickness of the mold itself may be thick, and therefore, the upper limit of the thickness is preferably 4 mm as described above.

In addition, an upper limit of each groove pitch is more preferably 15 mm or less. A lower limit of each groove pitch is sufficient if the grooves can be formed stably, and is preferably 3 mm or more as described above. Note that the groove pitch needs to be larger than the groove width as a matter of course.

A cross-sectional shape of each groove in the plurality of concentric grooves 13 is not particularly limited, and may be, for example, any of a V-groove, a round groove, or an angular groove. From the viewpoint of ease of processing, a V-groove is preferable.

Quartz powder to be a raw material normally has a particle size of 50 μm or more and 300 μm or less. Quartz powder having such a particle size is easily caught on concentric grooves having the above width, depth and pitch. Note that the inventive mold can also be applied to quartz powder with a range other than this range.

FIG. 1 shows an example in which the plurality of concentric grooves 13 are formed across a whole of the inner surface 12 of the straight body portion of the mold 11, but an effect of the present invention of suppressing the sliding down of quartz powder on the inner surface of the mold can be obtained if the plurality of concentric grooves 13 are formed in at least a part of the straight body portion of the inner surface 12 of the mold 11. In particular, it is sufficient to form the grooves 13 in a position where a particular raw material powder is to be applied.

FIG. 2 shows a diagram of a different example of the mold according to the present invention. FIG. 2 (a) is a schematic cross-sectional view of the mold and FIG. 2 (b) is a top view of the mold. FIG. 2 shows an example in which a plurality of grooves 23 that are concentric with respect to a mold rotation axis 25 are formed across a whole of the inner surface 22 of the mold 21.

In the inventive mold, the material of the mold is preferably stainless steel or carbon. By using such a material for the mold, the mold can be made more suitable for manufacturing a quartz glass crucible. When a mold made of carbon is used, the mold can be used in a state of reduced pressure by suction from the outside. In this case too, in the inventive mold, the groove shape of the plurality of concentric grooves 13 and 23 need to be formed as non-penetrating grooves.

Moreover, the present invention provides a method for manufacturing a quartz glass crucible. This method is a method for manufacturing a quartz glass crucible, including the steps of: while rotating the mold 11, 21, blowing quartz powder onto the inner surface 12, 22 of the rotating mold 11, 21 to form a quartz powder compact having a prescribed shape formed of quartz powder, and melting the formed quartz powder compact to fabricate a quartz glass crucible. When the quartz powder is blown onto the inner surface 12, 22 of the rotating mold 11, 21, the quartz powder is blown at the inner surface including a portion where the plurality of concentric grooves 13, 23 are present.

FIG. 3 shows a schematic diagram explaining the function of the mold according to the present invention in comparison to a conventional mold. FIGS. 3 (*a*) and (*b*) are an example using a conventional mold, and FIGS. 3 (*c*) and (*d*), the inventive mold. Note that the shape, pitch and the like of the grooves are shown schematically to make the diagrams easy to see, and do not necessarily reflect the actual dimensions. As shown in FIGS. 3 (*a*) and (*b*), in the conventional mold, when quartz powder is blown from a raw-material-powder-supply pipe onto the inner surface of the mold, powder adhesion (adhesion of the quartz powder to the inner surface of the mold) is poor since there is no groove processing and the quartz powder slides, and a lot of quartz powder is deposited in a small curved portion (a curved portion directly below the straight body portion). Meanwhile, as shown in FIGS. 3 (*c*) and (*d*), with the groove-processed mold of the present invention, the quartz powder gets caught in the grooves, and powder adhesion is favorable. Therefore, the quartz powder compact can be formed in the target position efficiently.

Experimental Examples 1 to 25 and Comparative Experimental Example 1

In order to determine favorable ranges for the width, depth, and pitch of the grooves to form on the inner surface of the mold, a plate 47 made of stainless steel (SUS) with grooves 48 processed was mounted on an inner surface 42 of a conventional mold 41 having an inner diameter of 32 inches (approximately 81 cm) as shown in FIG. 4, and the state of powder adhesion was investigated. In each Experimental Example, a plate with a flat surface made of stainless steel (SUS) (100 mm×500 mm×thickness of 5 mm) was groove-processed. The groove width, groove depth, and groove pitch of the grooves to form on the stainless steel were altered as shown in Table 1 and the state of powder adhesion was investigated. In the Comparative Experimental Example, a stainless steel plate without groove-processing was used and the state of powder adhesion was investigated.

The plate 47 was attached to the straight body portion of the inner surface 42 of the mold 41 as shown in FIG. 4, and the state of powder adhesion depending on groove width was evaluated in comparison to the state of powder adhesion of the mold 41 itself. This was performed with a V-groove-processed groove shape, considering ease of processing. Two types of processing tool (cutting tool tip) having a tip angle of 55° and 80° were used for the groove-processing to change the groove depth.

Table 1 also shows the thickness after processing (thickness of the thinnest portion) on the assumption that the mold is directly groove-processed under the conditions of each Experimental Example and Comparative Experimental Example, and thickness ratio when the mold is directly groove-processed. The thickness of the mold itself was 5 mm.

Experimental Example 26

The same experiment as Experimental Examples 1 to 25 was performed using a plate made of carbon instead of a plate made of stainless steel. The groove width, groove depth, and groove pitch of the grooves to form on this plate made of carbon are as shown in Table 1.

TABLE 1

|  | Groove width (mm) | Processing tool angle | Groove depth (mm) | Groove pitch (mm) | Confirmation of powder adhesion | Thickness after processing when the mold is directly groove-processed (mm) | Thickness ratio when the mold is directly groove-processed |
|---|---|---|---|---|---|---|---|
| Experimental Example 1 | 0.3 | 55° | 0.2 | 10 | Favorable | 4.8 | 96% |
| Experimental Example 2 | 0.35 | 80° | 0.2 | 10 | Favorable | 4.8 | 96% |
| Experimental Example 3 | 0.4 | 55° | 0.3 | 10 | Favorable | 4.7 | 94% |
| Experimental Example 4 | 0.4 | 80° | 0.2 | 10 | Favorable | 4.8 | 96% |
| Experimental Example 5 | 0.5 | 55° | 0.4 | 10 | Particularly favorable | 4.6 | 92% |
| Experimental Example 6 | 0.4 | 80° | 0.3 | 10 | Particularly favorable | 4.7 | 94% |
| Experimental Example 7 | 1.0 | 55° | 0.9 | 10 | Particularly favorable | 4.1 | 82% |
| Experimental Example 8 | 1.0 | 80° | 0.6 | 3.0 | Particularly favorable | 4.4 | 88% |
| Experimental Example 9 | 1.0 | 80° | 0.6 | 5.0 | Particularly favorable | 4.4 | 88% |
| Experimental Example 10 | 1.0 | 80° | 0.6 | 10 | Particularly favorable | 4.4 | 88% |
| Experimental Example 11 | 1.0 | 80° | 0.6 | 15 | Particularly favorable | 4.4 | 88% |
| Experimental Example 12 | 1.0 | 80° | 0.6 | 20 | Favorable | 4.4 | 88% |
| Experimental Example 13 | 1.5 | 55° | 1.4 | 10 | Particularly favorable | 3.6 | 72% |

TABLE 1-continued

|  | Groove width (mm) | Processing tool angle | Groove depth (mm) | Groove pitch (mm) | Confirmation of powder adhesion | Thickness after processing when the mold is directly groove-processed (mm) | Thickness ratio when the mold is directly groove-processed |
|---|---|---|---|---|---|---|---|
| Experimental Example 14 | 1.5 | 80° | 0.9 | 10 | Particularly favorable | 4.1 | 82% |
| Experimental Example 15 | 2.0 | 80° | 1.2 | 10 | Particularly favorable | 3.8 | 76% |
| Experimental Example 16 | 2.5 | 80° | 1.5 | 10 | Particularly favorable | 3.5 | 70% |
| Comparative Experimental Example 1 | None (flat surface) | — | — | — | Poor | 5.0 | 100% |
| Experimental Example 17 | 0.2 | 55° | 0.1 | 10 | Somewhat favorable | 4.9 | 98% |
| Experimental Example 18 | 0.2 | 80° | 0.1 | 10 | Somewhat favorable | 4.9 | 98% |
| Experimental Example 19 | 2.0 | 55° | 1.9 | 10 | Particularly favorable | 3.1 | 62% |
| Experimental Example 20 | 2.5 | 55° | 2.3 | 10 | Particularly favorable | 2.7 | 54% |
| Experimental Example 21 | 2.7 | 55° | 2.3 | 10 | Particularly favorable | 2.7 | 54% |
| Experimental Example 22 | 1.0 | 80° | 0.6 | 2.5 | Particularly favorable | 4.4 | 88% |
| Experimental Example 23 | 1.0 | 80° | 0.6 | 30 | Somewhat favorable | 4.4 | 88% |
| Experimental Example 24 | 4.5 | 55° | 4.0 | 10 | Favorable | 1.0 | 20% |
| Experimental Example 25 | 5.0 | 55° | 4.5 | 10 | Favorable | 0.5 | 10% |
| Experimental Example 26 (carbon material) | 1.0 | 55° | 0.9 | 10 | Particularly favorable | 4.1 | 82% |

It was confirmed from the result of each Experimental Example and Comparative Experimental Example that powder adhesion is favorable when the groove width is 0.3 mm or more and 2.5 mm or less, and the groove depth is 0.2 mm or more and 1.5 mm or less (Experimental Examples 1 to 16). In addition, although the effect was somewhat small with a groove width of 0.2 mm (Experimental Examples 17 and 18), powder adhesion was more favorable than in the case with no grooves (Comparative Experimental Example 1). In addition, it was confirmed that powder adhesion was also favorable in Experimental Example 26, in which a carbon material was used.

In Experimental Examples 19 (groove depth: 1.9 mm) and 20 (groove depth: 12.3 mm) with the groove depths made larger than 1.5 mm, powder adhesion itself was particularly favorable. Moreover, in Experimental Example 24 with a groove depth of 4.0 mm and Experimental Example 25 with a groove depth of 4.5 mm, powder adhesion itself was also favorable (note that, since a tool of 55° was used, the groove widths were respectively 4.5 mm and 5.0 mm.). However, if the grooves on which the experiment was conducted in Experimental Examples 24 and 25 are formed on the inner surface of an actual mold inner surface, there is risk of mold strength being degraded. That is, as shown in Table 1, when a mold originally having a thickness of 5 mm is used, the thinnest portions become 1.0 mm and 0.5 mm if such grooves are made, and the thickness of the mold becomes too thin. Therefore, it is necessary to make the original thickness of the mold thicker to ensure a thickness of 2.5 mm at the thinnest portion, for example. When the material of the mold is stainless steel, the upper limit of the groove depth is preferably 2.5 mm, since the cost rises too much if the original thickness of the mold is made too thick.

On the other hand, for example, when a mold made of carbon is used, the groove depth may exceed 2.5 mm since normally, the thickness of the mold itself is sufficient. However, when the groove depth of the mold exceeds 4 mm as in Experimental Example 25, there is concern for bad influence due to formation of shapes on an outer surface of a manufactured crucible corresponding to the grooves of the mold. Therefore, the groove depth is preferably 4 mm or less. Note that, although a stainless steel plate is used for experiment in Experimental Examples 24 and 25, a similar effect can be obtained with a carbon material regarding improvement of powder adhesion.

Furthermore, under the conditions of the groove width being 1.0 mm and the groove depth being 0.6 mm, the groove pitch was set to 3 mm (Experimental Example 8), 5 mm (Experimental Example 9), 10 mm (Experimental Example 10), 15 mm (Experimental Example 11), and 20 mm (Experimental Example 12) to compare the state of powder adhesion depending on intervals between grooves. As a result, powder adhesion was favorable with a groove pitch of 3 mm or more and 15 mm or less (Experimental Examples 8 to 11). The degree of powder adhesion was somewhat lower with the groove pitch of 20 mm (Experimental Example 12) than in Experimental Examples 8 to 11, but was more favorable than in Comparative Experimental Example 1 or Experimental Examples 17 and 18.

In Experimental Example 22, the groove pitch was set to 2.5 mm under the conditions of the groove width being 1.0 mm and the groove depth being 0.6 mm. The resulting powder adhesion was particularly favorable, but there was no great difference with Experimental Example 8 with the groove pitch of 3 mm, and it was revealed that a groove pitch of 3 mm or more is sufficient.

Furthermore, when the groove pitch was set to 30 mm under the condition of the groove width being 1.0 mm and the groove depth being 0.6 mm in Experimental Example 23, the effect was even smaller than in Experimental Example 12. Even so, powder adhesion was more favorable than in the case with no grooves (Comparative Experimental Example 1).

Using a mold groove-processed under the conditions corresponding to a groove width of 0.5 mm (Experimental Example 5), 1.0 mm (Experimental Example 7), 1.5 mm (Experimental Examples 13 and 14), 2.0 mm (Experimental Example 15), and 2.5 mm (Experimental Example 16) with a groove pitch of 10 mm, a crucible was melted, and the outward appearance of the crucible was checked. As a result, there were no problems with the groove width of 0.5 mm (Experimental Example 5), 1.0 mm (Experimental Example 7), 1.5 mm (Experimental Examples 13 and 14), and 2.0 mm (Experimental Example 15). With the groove width of 2.5 mm (Experimental Example 16), faint lines were observed on the outer surface of the crucible, but on a level that does not become a big problem when pulling a silicon single crystal. The groove width was set to 2.7 mm in Experimental Example 21, but there was no great difference with Experimental Example 16 with the groove width of 2.5 mm, and it was revealed that a groove width of 2.5 mm or less is sufficient.

EXAMPLE

Hereinafter, the present invention will be described more specifically with reference to Examples and a Comparative Example thereof, but the present invention is not limited to these Examples, and needless to say, various modifications can be carried out unless deviating from the technical concept of the present invention.

Examples 1 to 5, Comparative Example 1

Using a 32-inch mold groove-processed with a groove width of 0.5 mm (Example 1), 1.0 mm (Example 2), 1.5 mm (Example 3), 2.0 mm (Example 4), and 2.5 mm (Example 5), formation was performed within a prescribed range of straight body portion (width: 250 mm) with a formation thickness of 10 mm, and the weight of the quartz powder that fell outside the prescribed range and was therefore collected and the collection time were compared. In addition, regarding a conventional mold with no grooves formed (Comparative Example 1), the weight of the quartz powder that fell outside the prescribed range and was collected and the collection time were also similarly compared. The results are shown in Table 2.

The groove width, groove depth, and groove pitch of the grooves formed in Examples 1 to 5 correspond respectively to those in Experimental Examples 5, 10, 14, 15, and 16. In addition, Comparative Example 1 corresponds to Comparative Experimental Example 1.

TABLE 2

| | Corresponding Experimental Example | Groove width (mm) | Processing tool angle | Groove depth (mm) | Groove pitch (mm) | Outward appearance of crucible | Weight of collected powder | Powder collection time | Thickness after processing (mm) | Thickness ratio |
|---|---|---|---|---|---|---|---|---|---|---|
| Example 1 | Experimental Example 5 | 0.5 | 55° | 0.4 | 10 | Favorable | 5.8 kg | 10 minutes 05 seconds | 4.6 | 92% |
| Example 2 | Experimental Example 10 | 1 | 80° | 0.6 | 10 | Favorable | 4.6 kg | 8 minutes 10 seconds | 4.4 | 88% |
| Example 3 | Experimental Example 14 | 1.5 | 80° | 0.9 | 10 | Favorable | 4.5 kg | 8 minutes 02 seconds | 4.1 | 82% |
| Example 4 | Experimental Example 15 | 2 | 80° | 1.2 | 10 | Favorable | 4.6 kg | 8 minutes 12 seconds | 3.8 | 76% |
| Example 5 | Experimental Example 16 | 2.5 | 80° | 1.5 | 10 | Observed lines on the outer surface | 4.5 kg | 8 minutes 08 seconds | 3.5 | 70% |
| Comparative Example 1 | Comparative Experimental Example 1 | None (flat surface) | — | — | — | Favorable | 10.5 kg | 19 minutes 14 seconds | 5.0 | 100% |

As can be seen from Table 2, in the case with no grooves (Comparative Example 1), the weight of the collected quartz powder was 10.5 kg in average, but the weight was reduced to about 5 kg by using a mold with grooves (Examples 1 to 5).

Furthermore, the time for collecting the quartz powder that stuck outside the prescribed range was compared. As a result, in the case with no grooves (Comparative Example 1), it took 19 minutes in average to collect the quartz powder that stuck outside the prescribed range, but with a groove width of 0.5 mm (Example 1), it took 10 minutes, and in the cases with 1.0 mm, 1.5 mm, 2.0 mm, and 2.5 mm (Examples 2 to 5), the collection time was about 8 minutes, as can be seen from Table 2.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A mold comprising:
   a plurality of grooves that are concentric with respect to a mold rotation axis in at least a straight body portion of an inner surface of the mold,
   wherein the plurality of concentric grooves are non-penetrating grooves that do not penetrate the mold,
   the plurality of concentric grooves have a width of 0.3 mm or more and 2.5 mm or less, a depth of 0.2 mm or more and 4 mm or less, and a pitch of 3 mm or more and 20 mm or less, and
   the mold is configured to manufacture a quartz glass crucible by a rotary molding method that includes blowing quartz powder onto the inner surface of the mold while rotating the mold.

2. The mold according to claim 1, wherein a material of the mold is stainless steel or carbon.

3. The mold according to claim 2, wherein the plurality of concentric grooves are formed across a whole of the inner surface of the straight body portion of the mold.

4. A method for manufacturing a quartz glass crucible, including the steps of:
   while rotating the mold according to claim 3, blowing the quartz powder onto the inner surface of the rotating mold to form a quartz powder compact having a prescribed shape formed of quartz powder, and
   melting the formed quartz powder compact to fabricate a quartz glass crucible, wherein
   when the quartz powder is blown onto the inner surface of the rotating mold, the quartz powder is blown at the inner surface including a portion where the plurality of concentric grooves are present.

5. The mold according to claim 2, wherein the plurality of concentric grooves are formed across a whole of the inner surface of the mold.

6. A method for manufacturing a quartz glass crucible, including the steps of:
   while rotating the mold according to claim 5, blowing the quartz powder onto the inner surface of the rotating mold to form a quartz powder compact having a prescribed shape formed of quartz powder, and
   melting the formed quartz powder compact to fabricate a quartz glass crucible, wherein
   when the quartz powder is blown onto the inner surface of the rotating mold, the quartz powder is blown at the inner surface including a portion where the plurality of concentric grooves are present.

7. A method for manufacturing a quartz glass crucible, including the steps of:
   while rotating the mold according to claim 2, blowing the quartz powder onto the inner surface of the rotating mold to form a quartz powder compact having a prescribed shape formed of quartz powder, and
   melting the formed quartz powder compact to fabricate a quartz glass crucible, wherein
   when the quartz powder is blown onto the inner surface of the rotating mold, the quartz powder is blown at the inner surface including a portion where the plurality of concentric grooves are present.

8. The mold according to claim 1, wherein the plurality of concentric grooves are formed across a whole of the inner surface of the straight body portion of the mold.

9. A method for manufacturing a quartz glass crucible, including the steps of:
   while rotating the mold according to claim 8, blowing the quartz powder onto the inner surface of the rotating mold to form a quartz powder compact having a prescribed shape formed of quartz powder, and
   melting the formed quartz powder compact to fabricate a quartz glass crucible, wherein
   when the quartz powder is blown onto the inner surface of the rotating mold, the quartz powder is blown at the inner surface including a portion where the plurality of concentric grooves are present.

10. The mold according to claim 1, wherein the plurality of concentric grooves are formed across a whole of the inner surface of the mold.

11. A method for manufacturing a quartz glass crucible, including the steps of:
    while rotating the mold according to claim 10, blowing the quartz powder onto the inner surface of the rotating mold to form a quartz powder compact having a prescribed shape formed of quartz powder, and
    melting the formed quartz powder compact to fabricate a quartz glass crucible, wherein
    when the quartz powder is blown onto the inner surface of the rotating mold, the quartz powder is blown at the inner surface including a portion where the plurality of concentric grooves are present.

12. A method for manufacturing a quartz glass crucible, including the steps of:
    while rotating the mold according to claim 7, blowing the quartz powder onto the inner surface of the rotating mold to form a quartz powder compact having a prescribed shape formed of quartz powder, and
    melting the formed quartz powder compact to fabricate a quartz glass crucible, wherein
    when the quartz powder is blown onto the inner surface of the rotating mold, the quartz powder is blown at the inner surface including a portion where the plurality of concentric grooves are present.

13. A mold comprising:
    a plurality of grooves that are concentric with respect to a mold rotation axis in at least a straight body portion of an inner surface of the mold, wherein the plurality of concentric grooves are non-penetrating grooves that do not penetrate the mold,
    the plurality of concentric grooves are formed across a whole of the inner surface of the mold, and
    the mold is configured to manufacture a quartz glass crucible by a rotary molding method that includes blowing quartz powder onto the inner surface of the mold while rotating the mold.

14. The mold according to claim 13, wherein a material of the mold is stainless steel or carbon.

15. A method for manufacturing a quartz glass crucible, including the steps of:
    while rotating the mold according to claim 14, blowing the quartz powder onto the inner surface of the rotating mold to form a quartz powder compact having a prescribed shape formed of quartz powder, and
    melting the formed quartz powder compact to fabricate a quartz glass crucible, wherein
    when the quartz powder is blown onto the inner surface of the rotating mold, the quartz powder is blown at the inner surface including a portion where the plurality of concentric grooves are present.

16. A method for manufacturing a quartz glass crucible, including the steps of:
   while rotating the mold according to claim 13, blowing the quartz powder onto the inner surface of the rotating mold to form a quartz powder compact having a prescribed shape formed of quartz powder, and
   melting the formed quartz powder compact to fabricate a quartz glass crucible, wherein
   when the quartz powder is blown onto the inner surface of the rotating mold, the quartz powder is blown at the inner surface including a portion where the plurality of concentric grooves are present.

* * * * *